United States Patent [19]

Yatka et al.

[11] Patent Number: 5,057,327
[45] Date of Patent: Oct. 15, 1991

[54] CHEWING GUM WITH LONGER LASTING SWEETNESS USING ALITAME

[75] Inventors: Robert J. Yatka, Orland Park; Gordon N. McGrew, Evanston, both of Ill.

[73] Assignee: Wm. Wrigley Jr. Company, Chicago, Ill.

[21] Appl. No.: 458,594

[22] Filed: Dec. 29, 1989

Related U.S. Application Data

[63] Continuation-in-part of PCT US89/01269 filed Mar. 28, 1989 published as WO90/06061 on Jun. 14, 1990

[51] Int. Cl.$^5$ .............................................. A23G 3/30
[52] U.S. Cl. ...................................... 426/3; 426/548; 426/804
[58] Field of Search ........................................ 426/3–6, 426/548, 804

[56] References Cited

U.S. PATENT DOCUMENTS

| | | | |
|---|---|---|---|
| 4,792,453 | 12/1988 | Reed et al. | 426/5 |
| 4,861,600 | 8/1989 | Chisari | 426/3 |
| 4,889,726 | 12/1989 | Dave et al. | 426/3 |
| 4,902,519 | 2/1990 | Ream | 426/5 |
| 4,904,482 | 2/1990 | Patel | 426/654 |
| 4,948,595 | 8/1990 | Patel | 426/3 |

Primary Examiner—Jeanette Hunter
Attorney, Agent, or Firm—Willian Brinks Olds Hofer Gilson & Lione

[57] ABSTRACT

A chewing gum composition having an extended sweetness and flavor intensity that is prepared from compositions comprising a gum base, flavor, sweetening and bulking agent, and Alitame present in an amount to extend the sweetness and flavor intensity compared to gum containing levels of sweetner that imparts a normal level of sweetness to the gum composition. The sweetness could be provided by sugar, sugar alcohols, Alitame or other high potency sweeteners.

16 Claims, 2 Drawing Sheets

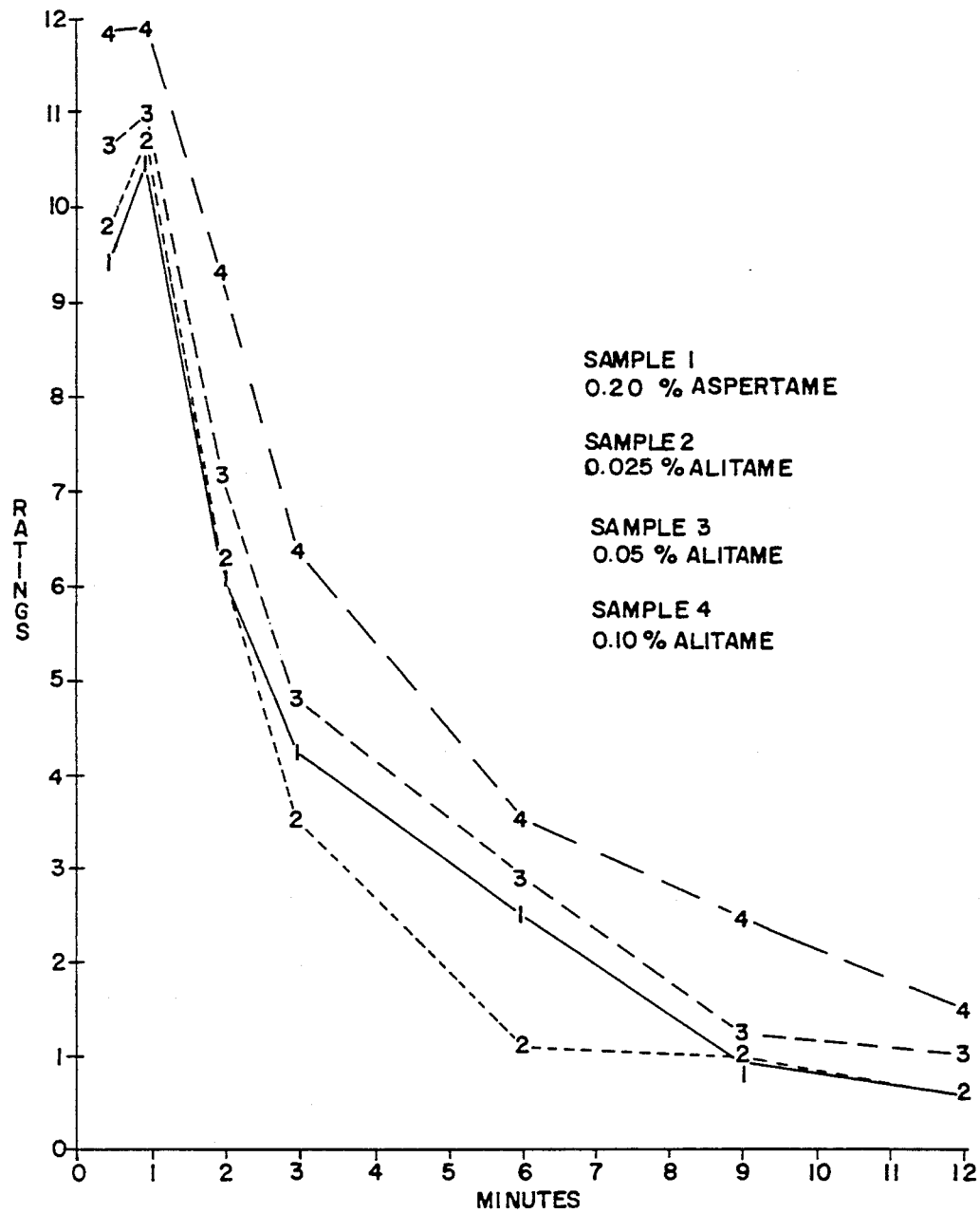

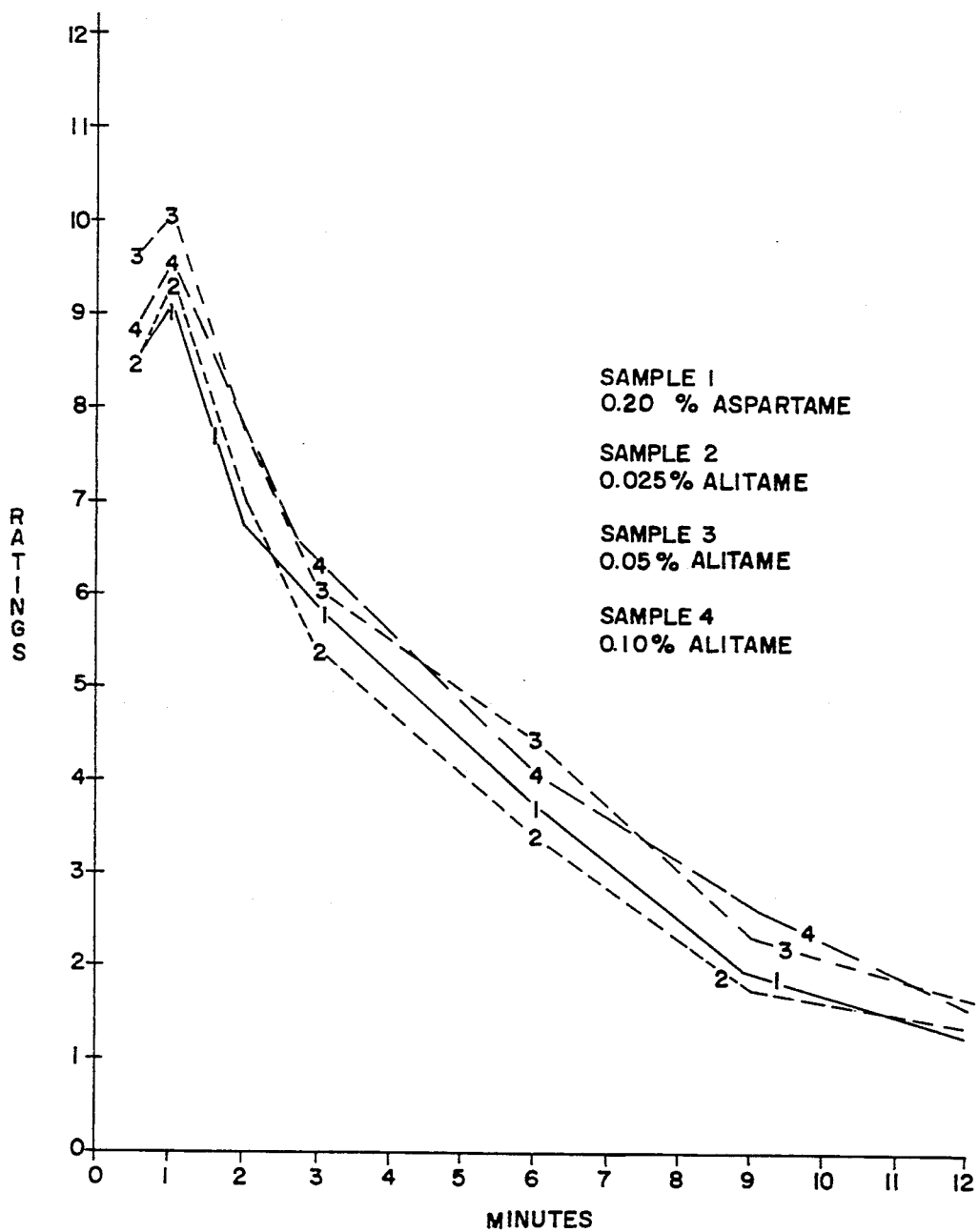

CHEWING GUM WITH LONGER LASTING SWEETNESS USING ALITAME

CROSS REFERENCE TO RELATED APPLICATION

This application is a continuation-in-part of application Ser. No. PCT/U.S. 89/01269, filed Mar. 28, 1989, published as WO90/06061 on Jun. 14, 1990. Incorporated herein by reference.

BACKGROUND OF THE INVENTION

This invention relates to chewing gums having longer lasting sweetness and flavor intensity.

Commercially available chewing gums generally comprise a water-soluble bulk portion and a water-insoluble gum base portion. Incorporated within the gum base portion may be elastomers, fillers and softeners to improve the texture of the gum. The gum may also contain flavors and sweetening agents such as sugar or, for sugarless chewing gums, artificial sweetening agents such as saccharin, acesulfame, and aspartame.

However, one of the limitations of commercially available chewing gums is their rapid loss of both sweetness and flavor intensity during chewing. One solution, disclosed in U.S. Pat. Nos. 3,943,258, 3,982,023 and 4,036,992 is to add aspartame to the gum composition in addition to the sweetener already present (which could also be aspartame). Where only aspartame is used to sweeten the gum, it is stated that the amount of aspartame required is greater than 0.3% by weight of the final composition. Where other sweeteners are used, including non-dipeptide artificial sweeteners, aspartame is used at a concentration as low as about 0.1% by weight of the final gum composition. The result is a gum whose normal sweetness and flavor is extended.

In addition, one of the limitations of sugarless gums is their bitter aftertaste when a sweetening agent like acesulfame is used at a concentration level to produce a gum having a normally accepted sweetness intensity. To remedy the bitter aftertaste, U.S. Pat. No. 4,536,396 discloses the use of Alitame in minor amounts to mask the bitter aftertaste of acesulfame and produce a synergistic sweetening effect. The amount of Alitame used in the examples is 0.01% or less by weight of the total gum composition.

Alitame, L-α-Aspartyl-N-(2,2,4,4-tetramethyl-3-thietanyl)-D-alaninamide hydrate, is a sweetening agent described in U.S. Pat. No. 4,411,925. This patent shows the use of Alitame with a sweetening agent like sorbitol or corn syrup in an amount to sweeten edible products, including chewing gum. The patent also discloses that Alitame is approximately 2000 times sweeter than sucrose, advantageously making it sweeter than aspartame, which is only up to 200 times sweeter than sucrose. Therefore, it is estimated that Alitame is about 10 times sweeter than aspartame. From tests using Alitame in gum it is estimated that the amount of Alitame needed to impart normally accepted sweetness to sugarless chewing gum is from about 0.01% to about 0.03% by weight of the final chewing gum composition.

Furthermore, it has been found that other properties of Alitame make its use in gum more advantageous than aspartame. Aspartame has a low solubility in water or solvent. On the other hand, Alitame is much more soluble in water and solvents such as alcohols. Therefore, it can be more easily formulated and used in manufacturing chewing gum.

SUMMARY OF THE INVENTION

The invention provides a chewing gum composition with about 5% to about 95% of gum base; about 0.1% to about 10% of flavor; about 10% to about 90% of a sweetening bulking agent selected from the group consisting of sugar, sugar alcohols, and mixtures thereof; and a minor amount of Alitame being present in an amount sufficient to provide the gum with an extended sweetness and flavor intensity compared to gum containing levels of Alitame which impart a normal level of sweetness to the gum. The gum composition is produced by providing about 5% to about 95% of gum base; about 0.1% to about 10% of flavor; about 10% to about 90% of a sweetening agent; and a minor amount of Alitame; then combining the ingredients to produce the gum composition. The composition is then further worked into sticks, chunks, pellets, and the like.

It has been found that chewing gums prepared in accordance with this invention have a sweetness and flavor intensity that remains higher and for a longer period of time than does a chewing gum having normally accepted sweetness intensity. Yet, these chewing gums do not have an excessively high initial release of sweetness and flavor intensity. The chewing gum composition may be either sugar-containing or sugarless.

BRIEF DESCRIPTION OF THE DRAWINGS

FIG. 1 is graph plot of a tasting panel's sensory perception of the sweetness intensity of four sample formulas of gum over time.

FIG. 2 is graph plot of a tasting panel's sensory perception of the flavor intensity of the same four sample formulas of gum over time.

DETAILED DESCRIPTION OF THE INVENTION AND PREFERRED EMBODIMENTS

Unless otherwise specified herein, all percents (%) are weight percents.

The chewing gums contemplated in this invention generally comprise a water-soluble bulk portion, a water-insoluble chewable gum base portion and typically water-insoluble flavoring agents. The water-soluble portion dissipates with a portion of the flavoring agent over a period of time during the chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. The insoluble gum base generally constitutes between about 5 to about 95 percent by weight of the gum, preferably about 10 to about 50 percent, and most preferably about 20% to about 30%.

The gum base typically also includes a filler component. The filler component may be calcium carbonate, magnesium carbonate, talc, dicalcium phosphate or the like. The filer may constitute between about 5 and about 60 percent by weight of the gum base.

Gum bases typically also contain softeners, including glycerol monosterate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. Softeners are added to the chewing gum in order to optimize the chewability of the gum and the mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup, and combinations thereof may be used as softeners and binding agents in the gum.

A flavoring agent may be present in the chewing gum in an amount within the range of from about 0.1 to about 10.0 percent, and preferably from about 0.5 to about 3.0 percent, of the gum. The flavoring agents may comprise essential oils, synthetic flavors, or mixtures thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further portions of the bulking agent may then be added to the mixer. A flavoring agent is typically added with the final portion of the bulking agent. A sweetening agent may be added to the mixer when convenient.

The entire mixing procedure typically takes from five to fifteen minutes, but longer mixing times may sometimes be required. Those skilled in the art will recognize that many variations of the above described procedure may be followed.

If the chewing gum to be prepared is not of the "sugarless" variety, a sugar is used. The term "sugar" is intended to include not only pure sugar (sucrose) but also other sugar-like sweeteners normally used in chewing gums such as dextrose, glucose (corn syrup), and the like, and mixtures thereof. If the chewing gum to be prepared is of the "sugarless" variety, a non-sugar sweetening bulking agent is used. Such sweetening and bulking agents include sugar alcohols such as sorbitol, mannitol, xylitol and the like. High potency sweeteners such as aspartame, salts of acesulfame, saccharin acid and its salts, sucralose, cyclamates and its salts and mixtures thereof may be used to impart a normal level of sweetness to such sugarless gums.

Typically, the sweetening agent is added to the chewing gum composition in an amount to impart a normally accepted sweetness intensity to the chewing gum. However, at these concentrations, the chewing gums, whether they are sugar-containing or sugarless, lose their sweetness and flavor intensity within a few minutes. However, if the concentration of the sweetening agent is increased in an attempt to extend the sweetness and flavor intensity, then the initial sweetness and flavor intensity will be excessive.

It has been found that adding Alitame to the chewing gum composition in an effective amount will extend the time that a high level of sweetness and flavor intensity is discernible during chewing. The amount of Alitame necessary to achieve this sweetness and flavor intensity extension will vary according to the amount of gum base, flavor, and sweetening agent used. Generally, it has been found that the addition of Alitame at a level of about 0.01% to about 0.03% by weight of a sugarless gum composition corresponds to the normally accepted sweetness intensity of gum where Alitame is intended to be the primary sweetener. When Alitame is used at a level above about 0.04% by weight of the total gum composition, the sweetness and flavor intensity will be extended beyond that of gum using Alitame present in an amount that provides a normally accepted sweetness intensity.

In gums where the normal level of sweetness is provided by sweetening agents including sugar alcohols such as sorbitol, mannitol, xylitol and the like, and high potency sweeteners such as aspartame, salts of acesulfame, saccharin acid, and its salts, sucralose, cyclamates and its salts and mixtures thereof, it is expected that the addition of Alitame will extend the sweetness and flavor intensity.

The upper limit at which Alitame may be added is subject solely to considerations of the undesirability of imparting an excessive initial sweetness intensity to the gum. While this consideration depends greatly upon individual preference, it is expected that levels of greater than about 0.2% will result in a chewing gum of excessively sweet taste throughout the initial portion of the chewing period.

Where the sweetening and bulking agents used are not very sweet by themselves, the use of Alitame within the range of about 0.04% to about 0.2% by weight of the total gum composition results in a gum having an extended sweetness and flavor intensity in excess of that achieved when sweetening agents or Alitame are used at a concentration to impart normally accepted sweetness intensity. Even with the use of an increased level of Alitame, the gum does not exhibit excessive sweetness intensity during the initial chewing period. In sugar containing gums, or sugarless gums where other high potency sweeteners are used to impart a normal level of sweetness, the use of Alitame within the range of about 0.02% to about 0.2% of the total gum composition results in a gum having an extended sweetness.

Four sugarless gum compositions were prepared from the following formulas:

| Ingredient | % Composition | | | |
|---|---|---|---|---|
| | Sample 1 | Sample 2 | Sample 3 | Sample 4 |
| Chewing Gum Base | 25.5 | 25.5 | 25.5 | 25.5 |
| Sorbitol | 49.2 | 49.375 | 49.35 | 49.3 |
| Mannitol | 8.0 | 8.0 | 8.0 | 8.0 |
| Glycerin | 8.6 | 8.6 | 8.6 | 8.6 |
| Lycasin | 6.8 | 6.8 | 6.8 | 6.8 |
| Lecithin | 0.2 | 0.2 | 0.2 | 0.2 |
| Color | 0.05 | 0.05 | 0.05 | 0.05 |
| Flavor | 1.45 | 1.45 | 1.45 | 1.45 |
| Aspartame | 0.20 | — | — | — |
| Alitame | — | 0.025 | 0.05 | 0.10 |
| | 100.00 | 100.00 | 100.00 | 100.00 |

The compositions were generally prepared by providing the individual ingredients, combining them, and then preparing them into pieces for testing. The gum base was melted and added to a running mixer. Then the color, lecithin, and sorbitol were added in the first three minutes of mixing. The mannitol, lycasin, glycerin, Alitame or aspartame were added within the next two to three minutes. The flavor was added last at minute eight. The entire mixing procedure was thirteen minutes. The composition was then discharged from the mixer and formed into pieces.

In order to measure the sweetness and flavor intensity duration in a chewing gum, taste tests were conducted using trained personnel to evaluate the intensity of sweetness and flavor over time. Panel members were given a stick of gum and asked to chew and record their sensor perception for sweetness and flavor intensity at selected times. Comparisons were made between Sample 1 (used as a control) and the other Samples. The following was observed:

| Time (Min.) | Sample 1 | Sample 2 | Sample 3 | Sample 4 |
|---|---|---|---|---|
| Sweetness Intensity | | | | |
| 0.5 | 9.45 | 9.79 | 10.64 | 11.81 |
| 1.0 | 10.44 | 10.66 | 10.94 | 11.88 |
| 2.0 | 6.10 | 6.26 | 7.16 | 9.35 |
| 3.0 | 4.23 | 3.52 | 4.81 | 6.42 |
| 6.0 | 2.49 | 1.10 | 2.92 | 3.55 |
| 9.0 | 0.96 | 1.02 | 1.28 | 2.50 |
| 12.0 | 0.63 | 0.62 | 1.06 | 1.56 |
| Flavor Intensity | | | | |
| 0.5 | 8.50 | 8.41 | 9.59 | 8.80 |
| 1.0 | 9.09 | 9.31 | 10.05 | 9.55 |
| 2.0 | 6.75 | 7.03 | 7.71 | 7.77 |
| 3.0 | 5.87 | 5.41 | 6.07 | 6.33 |
| 6.0 | 3.76 | 3.43 | 4.45 | 4.13 |
| 9.0 | 1.94 | 1.78 | 2.38 | 2.71 |
| 12.0 | 1.24 | 1.33 | 1.64 | 1.56 |

The results are also shown graphically in FIGS. 1 and 2. The results showed that the use of Alitame at levels of 0.05% to 0.1% resulted in a gum having a slightly higher initial sweetness and flavor but an extended sweetness compared to the gum having Alitame or another sweetening agent present in an amount to impart normally accepted sweetness intensity.

Sample 2 had a sweetness intensity similar to Sample 2 in the first two to three minutes but decreased significantly after three minutes. When the level of Alitame in the gum composition was increased, as in Samples 3 and 4, there was only a slight, but not excessive, initial increase in the sweetness intensity in the first one to two minutes. Yet the sweetness intensity remained higher even up to twelve minutes.

Furthermore, Sample 2 had a similar flavor intensity as Sample 1 in the first two to three minutes but decreased significantly after three minutes. When the level of Alitame in the gum composition was increased, as in Samples 3 and 4, there was only a slight, but not excessive, initial increase in the flavor intensity in the first one to two minutes. Yet the flavor intensity remained higher even up to twelve minutes.

Sample 3 is the preferred embodiment of the present invention.

Considerations of Alitame stability with respect to certain gum ingredients are discussed in U.S. Pat. application Ser. No. 07/458,989, filed on Dec. 29, 1989, now U.S. Pat. No. 4,997,659, and incorporated herein by reference.

Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

We claim:

1. A chewing gum composition comprising:
   a) about 5% to about 95% gum base;
   b) about 0.1% to about 10% flavor;
   c) about 10% to about 90% of a sweetening agent selected from the group consisting of sugar, sugar alcohols, and mixtures thereof; and
   d) a minor amount of Alitame, the Alitame being present in an amount sufficient to provide the gum with an extended sweetness and flavor intensity compared to gum containing levels of sweeteners which impart a normal level of sweetness to the gum.

2. The chewing gum composition of claim 1 wherein the Alitame is present at a level greater than about 0.04% by weight of the total gum composition.

3. The chewing gum composition of claim 1 wherein the Alitame is present at a level of about 0.04% to about 0.2% by weight of the total gum composition.

4. The chewing gum composition of claim 1 wherein said sweetening and bulking agent is sugar.

5. The chewing gum composition of claim 1 wherein said sweetening and bulking agent is sugar and the Alitame is present at a level greater than about 0.02% by weight of the total gum composition, the sugar being present in an amount to impart a normal level of sweetness to the gum.

6. The chewing gum composition of claim 1 wherein said sweetening and bulking agent is a sugar alcohol.

7. The chewing gum composition of claim 1 wherein said sweetening and bulking agent is sugar alcohol and the Alitame is present at a level greater than about 0.02% by weight of the total gum composition, the sugar alcohol and sweetening agents other than Alitame being present in an amount to impart a normal level of sweetness to the gum.

8. The chewing gum composition of claim 1 further comprising a non-dipeptide artificial sweetener selected from the group consisting of salts of acesulfame, sucralose, saccharin acid and its salts, cyclamate and its salts, and mixtures thereof.

9. A method of producing a gum composition comprising the steps of:

a) providing
   about 5% to about 95% by weight of gum base,
   about 10% to about 90% by weight of a sweetening and bulking agent,
   about 0.1% to about 10% by weight of a flavor, and
   a minor amount of Alitame, the Alitame being present in an amount sufficient to provide the gum with an extended sweetness and flavor intensity compared to gum containing levels of sweeteners which impart a normal level of sweetness to the gum;

b) combining the gum base, sweetening and bulking agent, flavor, and Alitame to produce a chewing gum composition.

10. The method of claim 9 wherein the Alitame is present at a level greater than about 0.04% by weight of the total gum composition.

11. The method of claim 9 wherein the Alitame is present at a level of about 0.04% to about 0.2% by weight of the total gum composition.

12. The method of claim 9 wherein the sweetening and bulking agent used is sugar.

13. The method of claim 9 wherein the sweetening and bulking agent used is a sugar alcohol.

14. The method of claim 9 further comprising the step of combining a non-dipeptide artificial sweetener in the gum composition, said non-dipeptide sweetener selected from the group consisting of salts of acesulfame, sucralose, saccharin acid and its salts, cyclamate and its salts, and mixtures thereof.

15. The method of claim 12 wherein the Alitame is present at a level greater than about 0.02% by weight of the total gum composition.

16. The method of claim 14 wherein the non-dipeptide artificial sweetener and the sweetening and bulking agent are present in an amount to impart a normal level of sweetness to the gum and the Alitame is present at a level greater than about 0.02% by weight of the total gum composition.

* * * * *

UNITED STATES PATENT AND TRADEMARK OFFICE
CERTIFICATE OF CORRECTION

PATENT NO. : 5,057,327
DATED : October 15, 1991
INVENTOR(S) : Robert J. Yatka et al.   Page 1 of 2

It is certified that error appears in the above-identified patent and that said Letters Patent is hereby corrected as shown below:

On the Title page, item [56]:

IN THE REFERENCES CITED

On page 1, column 2, under the heading "U.S. PATENT DOCUMENTS", before the 4,792,453 reference, please insert --3,943,258   3/1976   Bahoshy et al. ............... 426/3
  3,982,023   9/1976   Bahoshy et al. ............... 426/3
  4,036,992   7/1977   Bahoshy et al. ............... 426/3
  4,384,004   5/1983   Cea et al. ................... 426/3
  4,411,925   10/1983  Brennan et al. ............... 426/3
  4,536,396   8/1985   Stephens, Jr. et al. ......... 426/548--;

and after the 4,792,453 reference, please insert

--4,806,364   2/1989   Kubota et al. ................ 426/3--.

On page 1, column 2, after the 4,948,595 reference, please insert

--OTHER DOCUMENTS

"Alitame - A New High Intensity Sweetener Technical Summary - 1987"  Brochure by Pfizer.--

IN THE ABSTRACT

On page 1, column 2, line 6 of the Abstract, please delete "sweetner" and substitute therefor --sweetener--.

UNITED STATES PATENT AND TRADEMARK OFFICE
CERTIFICATE OF CORRECTION

PATENT NO. : 5,057,327

DATED : October 15, 1991

INVENTOR(S) : Robert J. Yatka et al.

It is certified that error appears in the above-identified patent and that said Letters Patent is hereby corrected as shown below:

In column 5, line 64, please delete "2" and substitute therefor --1--.

Signed and Sealed this

Twenty-first Day of September, 1993

Attest:

BRUCE LEHMAN

Attesting Officer

Commissioner of Patents and Trademarks